Feb. 27, 1923.

W. G. COX

SECTIONAL BUMPER FOR MOTOR VEHICLES

Filed Sept. 7, 1922

1,446,617

2 sheets-sheet 1

Inventor
W. G. COX.

By
Attorney

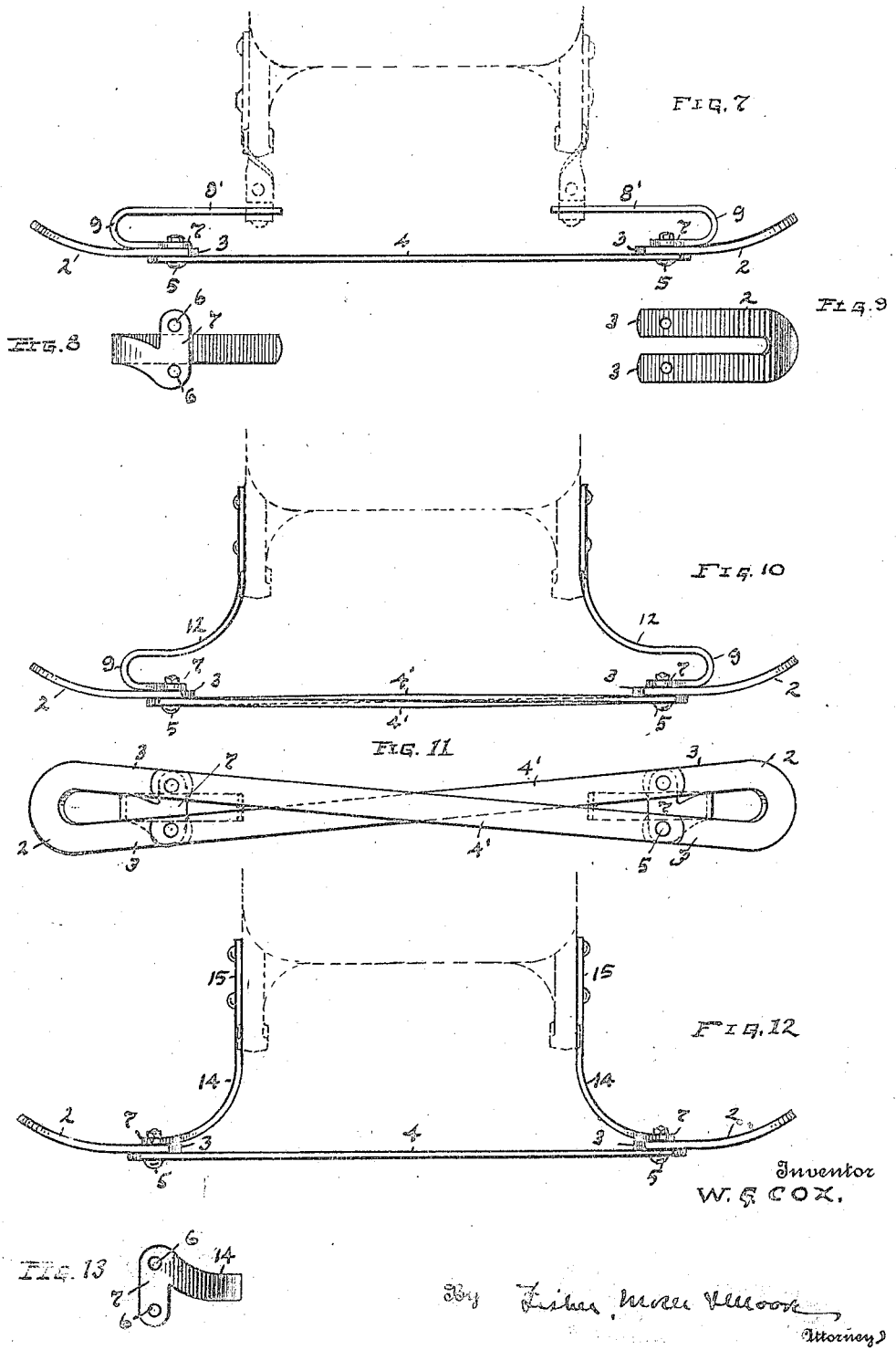

Patented Feb. 27, 1923.

1,446,617

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

SECTIONAL BUMPER FOR MOTOR VEHICLES.

Application filed September 7, 1922. Serial No. 586,684.

*To all whom it may concern:*

Be it known that I, WILLIAM G. COX, a citizen of the United States, residing at Cleveland, in the county of Cuyahoga and State of Ohio, have invented certain new and useful Improvements in a Sectional Bumper for Motor Vehicles, of which the following is a specification.

My invention relates to an improvement in a sectional bumper for motor-vehicles, the object being to provide a wide-faced bumper of symmetrical form and attractive appearance in which separate U members form end impact portions and a plural number of spring bars form the middle impact portion of the bumper, and in which a single bar or a pair of independent attachment arms are used to support the U members and the main impact bars jointly but separably upon the vehicle frame. This sectional construction permits this bumper to be easily assembled and disassembled; and it is also convenient to repair or replace any section or part when bent or damaged by accident or collision.

Figure 1:
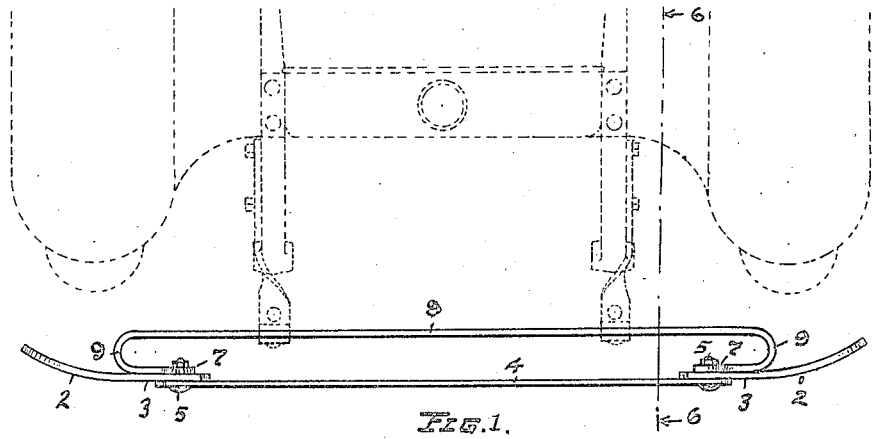
Figure 2:
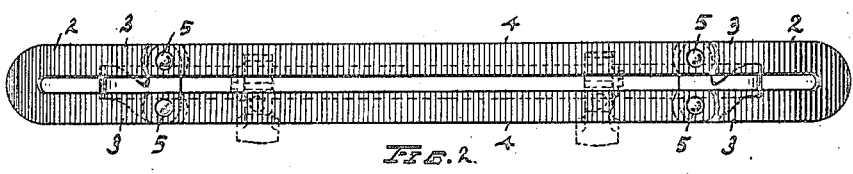
Figure 3:
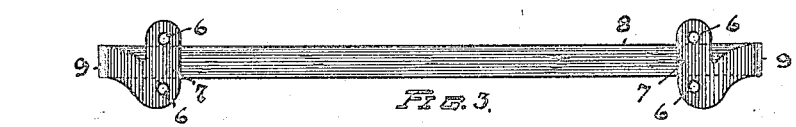
Figure 4:
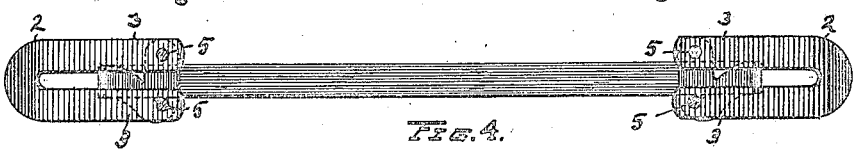
Figure 5:
Figure 6:
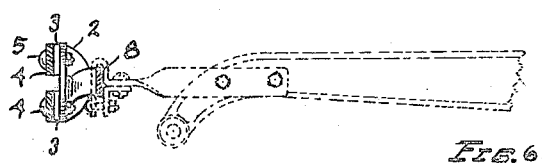

In the annexed drawings, Fig. 1 is a top view of one form of my improved bumper attached to a motor-vehicle which is shown in dotted lines. Fig. 2 is a front view of the same bumper. Fig. 3 is a front view of the rear supporting bar. Fig. 4 is a front view of the bumper without the middle impact bars. Fig. 5 is a perspective view of one of the main impact bars. Fig. 6 is a vertical section of the bumper on line 6—6 of Fig. 1, showing the vertical frame and a bumper supporting bracket in dotted lines. Fig. 7 is a plan view corresponding to Fig. 1 but showing the two separate supporting arms instead of the single supporting bar. Fig. 8 is a front view of one of the supporting arms, and Fig. 9 a front view of one of the U-shaped impact members. Fig. 10 is a top view of a bumper embodying the same U members but showing a different form of attachment arm and crossed impact bars. Fig. 11 is a front view of the bumper delineated in Fig. 10. Fig. 12 is a plan view of a bumper having the same detachable U sections at its opposite ends but a slightly different form of attachment arm, and Fig. 13 is a front view of one of these attachment arms.

Referring to Sheet 1 of the drawings, the bumper shown thereon consists of a front impact portion in the form of a narrow elongated loop having round closed ends. The parallel impact portions of this loop are flat and lie in higher and lower planes to provide a wide-faced bumper as compared with a single bar bumper. The loop is made in four pieces, the ends consisting of two similar U members 2—2 made of flat spring bars bent double edgewise to provide straight parallel legs 3—3 of equal length, and the middle portion of the bumper comprising two straight spring bars 4—4 of equal length. The leg portions of the two U members 2—2 and the ends of the two bars 4—4 are provided with bolt openings to receive bolts 5 in uniting the parts together when overlapped. The same bolts extend through bolt openings 6 formed in the vertically-bent extremities 7—7 of a supporting member 8 and detachably unite all these parts together. Member 8 may be a single flat bar having its opposite ends curved and rounded and bent inwardly for a short distance to provide spring loops 9—9. Each extremity 7 of bar 8 is bent downwardly and thence upwardly to provide a relatively wide face vertically against which the two legs 3—3 of U member 2 may be rigidly clamped, substantially as shown in Figs. 1 and 4. The two main impact bars 4—4 are clamped horizontally one above the other against the outer flat faces of legs 3—3 and form prolongations of the legs of both U members which extend in opposite directions and are also preferably curved rearwardly in the flat portions at or near their round portions.

Where a single rear bar 8 is used as shown in Fig. 1, it may be gripped and held in any suitable clamping device or attachment bracket affixed to or forming part of the vehicle frame. The same mode of mounting the bumper upon the vehicle may be practiced where the middle portion of rear bar 8 is omitted and the same loop end portions 9—9 are retained as shown in Fig. 7. Thus instead of a single rear bar I may use two separate rear arms 8'—8' to attach the front impact members to the vehicle. The front extremity 7 of each arm 8' is also bent downwardly and upwardly in the same way as bar 8 to provide a wide vertical face capable of permitting two main impact bars 4 to be clamped at different elevations thereto.

In Fig. 10 I show separate attachment arms 12 having the same vertically-extended extremities 7 as in bar 8 and arms 8' and the same loop formation 9, but the rear portions of arms 12 are curved and extend rearwardly on straight lines to permit them to be bolted or clamped to the sides of the vehicle frame instead of to front projecting brackets. The two main impact bars 4'—4' are also shown horizontally crossed instead of parallel, which makes the bumper wider at its ends than at its middle but these middle bars are still prolongations of the legs of the U members at the ends of the bumper.

In Figs. 12 and 13, I show a further modification of a bumper attachment arm 14 which possesses no loop portion 9 but is instead curved rearwardly from the vertically-bent extremity 7 to a straight attachment end 15. In Fig. 13 this extremity 7 is the same as in the other forms herein described but shown inverted.

The opposite ends of my broad-faced bumper, in all the forms described, are U-shaped and made detachable from the middle impact bars and the attachment arms. The separate parts can be packed compactly for shipment. In the event of a collision, the shock or impact may occur directly at the middle or either end. If severe the bumper becomes bent or damaged where the bumper is struck and the shock is absorbed. In the present bumper if either end is damaged, it can be readily detached and repaired. The same is true of the main bars at the middle, and of the supporting arms also. It is also a simple matter to straighten any one of the several parts of the bumper when bent, because these may be detached for that purpose. This is of advantage when traveling, especially if the ends alone are bent back against a wheel. In fact either end may be removed temporarily, if damaged, and the remainder of the bumper may be fastened together and still have utility.

What I claim is:

1. A sectional bumper for motor-vehicles, comprising flat end members of relatively elongated U shape, flat connecting bars uniting the legs of said U members together, and a bar having vertically-extending extremities adapted to support said members and bars to present duplicate impact faces above and below the longitudinal median line thereof.

2. A sectional bumper for motor-vehicles, comprising a pair of U members, a pair of flat spring bars, supporting means at the rear side of said members and bars having vertically-extending portions, and means uniting said members and bars separably together upon said vertically-extending portions.

3. A sectional bumper for motor-vehicles, comprising a pair of relatively long and narrow end members each made of flat steel bars doubled edgewise into U shape, a pair of flat steel bars having their ends overlapping the ends of the legs of said U members, and a single bar having looped ends and vertically-extending extremities adapted to support said U members and bars in the relation specified.

4. A sectional bumper for motor-vehicles, comprising a pair of end members each made of flat steel bars doubled edgewise into a relatively long and narrow U shape, a single support for both legs of each member, a pair of flat steel bars extending between said U members as prolongations of the legs thereof, and devices adapted to fasten said bars and members detachably together upon said supporting means.

5. A sectional bumper for motor-vehicles, comprising elongated end members each made of flat steel bars doubled into U shape, the legs of said U members having bolt openings therein, a pair of flat steel bars each having bolt openings in the opposite ends thereof, supporting members having vertically extended portions provided with openings spaced apart vertically, and bolts uniting said parts detachably together.

6. A sectional bumper for motor-vehicles, comprising a horizontal bar having its opposite ends bent and extended vertically and provided with bolt openings, a pair of end members each made of a flat steel bar doubled edgewise into U shape and perforated at its extremities, a pair of flat steel bars having bolt openings at their opposite ends, and bolts uniting said bars and U members and the said supporting bars separably together.

7. A sectional bumper for motor-vehicles, comprising a pair of main impact bars, a pair of U members made of flat bars doubled edgewise, spring supports having vertical end faces adapted to seat the legs of said U members and the ends of said bars in overlapping position thereon, and means detachably uniting said parts together where overlapped and seated.

8. A bumper for motor vehicles, comprising a horizontal bar having its opposite ends curved forwardly and bent inwardly and the extremities thereof bent vertically to provide common supports for a plural number of parallel impact bars, in combination with a plural number of bars fixed horizontally at different elevations to said bent extremities.

3. A bumper for motor vehicles, comprising a supporting bar having a curved spring extremity bent edgewise in one direction and thence vertically in the opposite directions to provide a vertically-extended flat face adapted to support a pair of horizontal impact bars at different elevations thereon, in combination with a pair of impact bars secured to said supporting bar as described.

In testimony whereof I affix my signature.

WILLIAM G. COX.